(12) United States Patent
Klein

(10) Patent No.: US 9,117,095 B2
(45) Date of Patent: *Aug. 25, 2015

(54) DATA SECURITY FOR DIGITAL DATA STORAGE

(71) Applicant: Round Rock Research LLC, Jersey City, NJ (US)

(72) Inventor: Dean A Klein, Eagle, ID (US)

(73) Assignee: Round Rock Research LLC, Parsippany, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/022,095

(22) Filed: Sep. 9, 2013

(65) Prior Publication Data

US 2014/0082375 A1    Mar. 20, 2014

Related U.S. Application Data

(63) Continuation of application No. 13/180,282, filed on Jul. 11, 2011, now Pat. No. 8,533,491, which is a continuation of application No. 11/524,097, filed on Sep. 20, 2006, now Pat. No. 7,979,720, which is a continuation of application No. 10/962,997, filed on Oct. 12, 2004, now Pat. No. 7,114,082, which is a continuation of application No. 09/277,482, filed on Mar. 26, 1999, now Pat. No. 6,857,076.

(51) Int. Cl.
    *H04L 9/32*      (2006.01)
    *H04L 9/00*      (2006.01)
    *G06F 21/80*      (2013.01)
    *G06F 21/85*      (2013.01)
    *H04L 9/08*      (2006.01)

(52) U.S. Cl.
CPC ............... *G06F 21/80* (2013.01); *G06F 21/85* (2013.01); *H04L 9/0861* (2013.01); *H04L 9/0866* (2013.01); *H04L 9/0894* (2013.01); *H04L 2209/12* (2013.01)

(58) Field of Classification Search
CPC ......... G06F 21/72; G06F 21/71; G06F 21/78; G06F 12/1408; H04L 63/08; H04L 63/083; H04L 9/08; H04L 9/0894; H04L 9/0861; H04L 2209/12
USPC .................. 713/165, 168, 189, 190, 192–194; 380/277, 44, 239, 242; 726/27, 30
See application file for complete search history.

(56) References Cited

U.S. PATENT DOCUMENTS

| | | |
|---|---|---|
| 4,150,404 A | 4/1979 | Tercic et al. |
| 4,262,329 A | 4/1981 | Bright et al. |
| 4,493,028 A | 1/1985 | Heath |
| 4,799,258 A | 1/1989 | Davies |

(Continued)

OTHER PUBLICATIONS

Casey D. Doyle, Ed., "The Comprehensive Standard for Business, School, Library, and Home," Microsoft Press, 2.sup.nd Ed., (1994) pp. 249,271,342,355.

(Continued)

*Primary Examiner* — Hosuk Song
(74) *Attorney, Agent, or Firm* — Gazdzinski & Associates PC

(57) ABSTRACT

A computing system includes data encryption in the data path between a data source and data storage devices. The data encryption may utilize a key which is derived at least in part from an identification code stored in a nonvolatile memory. The key may also be derived at least in part from user input to the computer.

24 Claims, 4 Drawing Sheets

(56) References Cited

U.S. PATENT DOCUMENTS

| | | | | |
|---|---|---|---|---|
| 4,864,616 A | * | 9/1989 | Pond et al. | 713/165 |
| 4,873,645 A | | 10/1989 | Hunter et al. | |
| 4,903,296 A | | 2/1990 | Chandra et al. | |
| 5,007,082 A | | 4/1991 | Cummins | |
| 5,052,040 A | | 9/1991 | Preston et al. | |
| 5,068,894 A | | 11/1991 | Hoppe | |
| 5,142,578 A | | 8/1992 | Matyas et al. | |
| 5,212,729 A | | 5/1993 | Schafer | |
| 5,231,662 A | | 7/1993 | Van Rumpt et al. | |
| 5,235,641 A | | 8/1993 | Nozawa et al. | |
| 5,265,159 A | | 11/1993 | Kung | |
| 5,317,638 A | | 5/1994 | Kao et al. | |
| 5,325,430 A | | 6/1994 | Smyth et al. | |
| 5,343,525 A | | 8/1994 | Hung et al. | |
| 5,375,243 A | | 12/1994 | Parzych et al. | |
| 5,379,344 A | | 1/1995 | Larsson et al. | |
| 5,394,469 A | | 2/1995 | Nagel et al. | |
| 5,402,492 A | | 3/1995 | Goodman et al. | |
| 5,442,706 A | | 8/1995 | Kung | |
| 5,483,596 A | | 1/1996 | Rosenow et al. | |
| 5,513,262 A | | 4/1996 | Van Rumpt et al. | |
| 5,563,950 A | | 10/1996 | Easter et al. | |
| 5,584,023 A | | 12/1996 | Hsu | |
| 5,592,549 A | | 1/1997 | Nagel et al. | |
| 5,604,800 A | | 2/1997 | Johnson et al. | |
| 5,606,610 A | | 2/1997 | Johansson | |
| 5,615,262 A | | 3/1997 | Guy et al. | |
| 5,623,546 A | | 4/1997 | Hardy et al. | |
| 5,631,960 A | | 5/1997 | Likens et al. | |
| 5,646,993 A | | 7/1997 | Aizawa | |
| 5,680,453 A | | 10/1997 | Akiyama et al. | |
| 5,682,549 A | | 10/1997 | Tanaka et al. | |
| 5,734,819 A | | 3/1998 | Lewis | |
| 5,745,568 A | | 4/1998 | O'Connor et al. | |
| 5,771,291 A | * | 6/1998 | Newton et al. | 713/185 |
| 5,796,828 A | | 8/1998 | Tsukamoto et al. | |
| 5,796,840 A | | 8/1998 | Davis | |
| 5,818,939 A | | 10/1998 | Davis | |
| 5,857,021 A | | 1/1999 | Kataoka et al. | |
| 5,857,024 A | | 1/1999 | Nishino et al. | |
| 5,978,815 A | | 11/1999 | Cabrera et al. | |
| 6,032,257 A | | 2/2000 | Olarig et al. | |
| 6,081,835 A | | 6/2000 | Antcliff et al. | |
| 6,085,238 A | | 7/2000 | Yuasa et al. | |
| 6,094,721 A | | 7/2000 | Eldridge et al. | |
| 6,185,546 B1 | | 2/2001 | Davis | |
| 6,185,681 B1 | | 2/2001 | Zizzi | |
| 6,199,163 B1 | | 3/2001 | Dumas et al. | |
| 6,216,230 B1 | | 4/2001 | Rallis et al. | |
| 6,249,866 B1 | | 6/2001 | Brundrett et al. | |
| 6,286,008 B1 | | 9/2001 | Matsumoto et al. | |
| 6,310,692 B1 | | 10/2001 | Fan et al. | |
| 6,327,608 B1 | | 12/2001 | Dillingham | |
| 6,343,282 B1 | | 1/2002 | Oshima | |
| 6,606,690 B2 | | 8/2003 | Padovano | |
| 6,615,349 B1 | | 9/2003 | Hair | |
| 6,668,323 B1 | | 12/2003 | Challener et al. | |
| 6,678,821 B1 | | 1/2004 | Waugh et al. | |
| 6,701,324 B1 | | 3/2004 | Cochran et al. | |
| 6,785,812 B1 | | 8/2004 | Botham et al. | |
| 6,789,195 B1 | | 9/2004 | Prihoda et al. | |
| 6,857,076 B1 | * | 2/2005 | Klein | 713/189 |
| 6,862,103 B1 | | 3/2005 | Miura et al. | |
| 6,876,835 B1 | | 4/2005 | Marko et al. | |
| 6,892,306 B1 | * | 5/2005 | En-Seung et al. | 713/193 |
| 6,947,556 B1 | | 9/2005 | Matyas et al. | |
| 7,010,689 B1 | | 3/2006 | Matyas et al. | |
| 7,024,474 B2 | | 4/2006 | Clubb et al. | |
| 7,096,370 B1 | | 8/2006 | Klein | |
| 7,114,082 B2 | * | 9/2006 | Klein | 713/193 |
| 7,178,021 B1 | | 2/2007 | Hanna et al. | |
| 7,873,837 B1 | * | 1/2011 | Lee et al. | 713/189 |
| 7,979,720 B2 | * | 7/2011 | Klein | 713/189 |
| 8,156,322 B2 | * | 4/2012 | Asnaashari et al. | 713/150 |
| 8,533,491 B2 | * | 9/2013 | Klein | 713/189 |
| 2001/0001876 A1 | | 5/2001 | Morgan et al. | |
| 2001/0039659 A1 | | 11/2001 | Simmons et al. | |
| 2001/0054099 A1 | | 12/2001 | Campbell et al. | |
| 2003/0046366 A1 | | 3/2003 | Pardikar et al. | |
| 2004/0044696 A1 | | 3/2004 | Frost | |

OTHER PUBLICATIONS

Microsoft Computer Dictionary, Third edition, 1997, Microsoft Press, pp. 332, 413.
Schneier, Applied Cryptography, 1996. John Wiley and Sons, Inc., Second edition, pp. 4-5.
Response to Office Action, dated Jun. 30, 2003, U.S. Appl. No. 09/277,482.
Non-Final Office Action, dated Apr. 10, 2003, U.S. Appl. No. 09/277,482.
Response to Rule 312 Communication, dated Jul. 3, 2006, U.S. Appl. No. 09/277,335.
Examiner Communication, dated Jun. 5, 2006, U.S. Appl. No. 09/277,335.
Notice of Allowance, dated Mar. 20, 2006, U.S. Appl. No. 09/277,335.
Response to Office Action, filed Dec. 21, 2005, U.S. Appl. No. 09/277,335.
Interview Summary, dated Dec. 15, 2005, U.S. Appl. No. 09/277,335
Final Office Action, dated Sep. 28, 2005, U.S. Appl. No. 09/277,335.
Supplemental Amendment, filed Sep. 20, 2005, U.S. Appl. No. 09/277,335.
Interview Summary, dated Sep. 20, 2005, U.S. Appl. No. 09/277,335.
Interview Summary, dated Sep. 15, 2005, U.S. Appl. No. 09/277,335.
Interview Summary, dated Jul. 21, 2005, U.S. Appl. No. 09/277,335.
Response to Office Action, filed Jul. 19, 2005, U.S. Appl. No. 09/277,335.
Non-Final Office Action, dated Apr. 20, 2005, U.S. Appl. No. 09/277,335.
Response to Office Action, filed Mar. 30, 2005, U.S. Appl. No. 09/277,335.
Final Office Action, dated Jan. 31, 2005, U.S. Appl. No. 09/277,335.
Response to Office Action, filed Jun. 28, 2004, U.S. Appl. No. 09/277,335.
Non-Final Office Action, dated Apr. 2, 2004, U.S. Appl. No. 09/277,335.
Advisory Action, dated Jan. 13, 2004, U.S. Appl. No. 09/277,335.
Response to Office Action, filed Dec. 17, 2003, U.S. Appl. No. 09/277,335.
Final Office Action, dated Oct. 22, 2003, U.S. Appl. No. 09/277,335.
Response to Office Action, filed Aug. 5, 2003, U.S. Appl. No. 09/277,335.
Non-Final Office Action, dated May 9, 2003, U.S. Appl. No. 09/277,335.
Interview Summary, Interview date Mar. 17, 2003, U.S. Appl. No. 09/277,335.
Response to Office Action, filed Apr. 4, 2003, U.S. Appl. No. 09/277,335.
Response to Office Action, filed Jan. 24, 2003, U.S. Appl. No. 09/277,335.
Final Office Action, dated Nov. 4, 2002, U.S. Appl. No. 09/277,335.
Supplemental Amendment, filed Oct. 8, 2002, U.S. Appl. No. 09/277,335.
Response to Office Action, filed Sep. 6, 2002, U.S. Appl. No. 09/277,335.
Non-Final Office Action, dated May 8, 2002, U.S. Appl. No. 09/277,335.
Notice of Allowance, dated Jun. 14, 2006, U.S. Appl. No. 10/962,997.
Response to Office Action, filed May 22, 2006, U.S. Appl. No. 10/962,997.
Non-Final Office Action, dated Feb. 22, 2006, U.S. Appl. No. 10/962,997.
Non-Final Office Action, dated Aug. 7, 2007, U.S. Appl. No. 11/521,163.
Non-Final Office Action, dated Aug. 7, 2007, U.S. Appl. No. 11/452,594.

(56) References Cited

OTHER PUBLICATIONS

Preliminary Amendment, filed Sep. 8, 2006, U.S. Appl. No. 11/452,594.
Response to Office Action, filed Nov. 7, 2007, U.S. Appl. No. 09/818,699.
Non-Final Office Action, dated Aug. 7, 2007, U.S. Appl. No. 09/818,699.
Response to Office Action, filed Jul. 17, 2007, U.S. Appl. No. 09/818,699.
Final Office Action, dated Apr. 17, 2007, U.S. Appl. No. 09/818,699.
Response to Office Action, filed Jan. 30, 2007, U.S. Appl. No. 09/818,699.
Non-Final Office Action, dated Oct. 30, 2006, U.S. Appl. No. 09/818,699.
Response to Office Action, filed Sep. 20, 2006, U.S. Appl. No. 09/818,699.
Final Office Action, dated Jul. 20, 2006, U.S. Appl. No. 09/818,699.
Response to Office Action, filed May 12, 2006, U.S. Appl. No. 09/818,699.
Non-Final Office Action, dated Feb. 13, 2006, U.S. Appl. No. 09/818,699.
Response to Office Action, filed Nov. 14, 2005, U.S. Appl. No. 09/818,699.
Advisory Action, dated Oct. 12, 2005, U.S. Appl. No. 09/818,699.
Response to Office Action, filed Sep. 14, 2005, U.S. Appl. No. 09/818,699.
Final Office Action, dated Jul. 15, 2005, U.S. Appl. No. 09/818,699.
Response to Office Action, filed Apr. 15, 2005, U.S Appl. No. 09/818,699.
Non-Final Office Action, dated Dec. 16, 2004, U.S. Appl. No. 09/818,699.
Konheim, Allen G., "Cryptography, A Primer", 1981, John Wiley and Sons, New York, pp. 348-363.
Microsoft Press—Computer Dictionary Second Edition, 1994, pp. 249, 271, 355.
Microsoft Press—Computer Dictionary Second Edition, 1994, pp. 271, 342.
Notice of Allowance dated Jul. 29, 2004, U.S. Appl. No. 09/277,482.
Response to Office Action, filed Apr. 29, 2004, U.S. Appl. No. 09/277,482.
Non-Final Office Action, dated Jan. 30, 2004, U.S. Appl. No. 09/277,482.
Advisory Action, dated Dec. 18, 2003, U.S. Appl. No. 09/277,482.
Response to Final Action, filed Nov. 21, 2003, U.S. Appl. No. 09/277,482.
Final Office Action, dated Sep. 24, 2003, U.S. Appl. No. 09/277,482.
FIPS PUB 140-1, Federal Information Processing Standards Publication, "Security Requirements for Cryptographic Modules," U.S. Department of Commerce. National Institute of Standards and Technology, Jan. 11, 1994. Available online at: http://csrc.nist.gov/publications/fips/fips1401.htm.
FIBS PUB 140-2, Federal Information Processing Standards Publication, "Security Requirements for Cryptographic Modules," U.S. Department of Commerce. National Institute of Standards and Technology, May 25, 2001 (updated Dec. 3, 2002).
Snouffer, R., Lee, A., Oldehoeft, A. "A Comparison of the Security Requirements for Cryptographic Modules in FIPS 140-1 and FIPS 140-2," U.S. Department of Commerce, National Institute of Standards and Technoology, Jun. 2001.
"Seagate Secure® Enterprise Self-Encrypting Drives FIPS 140 Module FIPS 140-2 Security Policy" Seagate Technology, LLC May 30, 2012.

* cited by examiner

DATA SECURITY FOR DIGITAL DATA STORAGE

This is a continuation of co-owned U.S. patent application Ser. No. 13/180,282 filed Jul. 11, 2011 of the same title, now U.S. Pat. No. 8,533,491, which is a continuation of U.S. patent application Ser. No. 11/524,097, filed on Sep. 20, 2006 of the same title, now U.S. Pat. No. 7,979,720, which is a continuation of U.S. patent application Ser. No. 10/962,997, filed on Oct. 12, 2004 of the same title, now U.S. Pat. No. 7,114,082, which is a continuation of U.S. patent application Ser. No. 09/277,482, filed on Mar. 26, 1999 of the same title, now U.S. Pat. No. 6,857,076, each of the foregoing incorporated herein by reference in its entirety.

BACKGROUND OF THE INVENTION

1. Field of the Invention

The invention relates to methods and apparatus for providing security for digital data stored on data storage media such as magnetic and optical disks and tapes.

2. Description of the Related Art

Over the past several years, personal computing systems have become more powerful, smaller, and less expensive. As this has occurred, more and more computing applications are performed on personal computer platforms. Local and wide area networks of personal computers are now often used in corporate and business applications instead of the large mainframes used for the same applications in the past. A further result of the increases in performance and decreases in price of personal computers is a dramatic increase in personal computer use for household financial and other sensitive and preferably confidential information.

The use of personal computers in these applications raises data security and privacy issues which have thus far been insufficiently resolved. Laptop and other personal computers, as well as the removable data storage media used in them are transported, mislaid, lost, and sometimes stolen. Consequently, security and privacy issues which were not present when computers and their data storage media were generally fixed have now become prominent. Administrators of computer resources in the business environment must remain aware of the location of portable computing devices as well as the nature of the programs and data stored on them. For home users, concerns arise if credit card, social security, or bank account numbers are present on fixed or removable media, which may be lost or stolen.

To resolve a few of these concerns, some programs allow the user to password protect documents or files, thereby preventing access to the data in the file unless the password is known. This provides limited security, however, since these schemes are easy to defeat with widely available password extraction programs. Furthermore, although the act of opening the file may be restricted in the relevant application program, the data itself resides on the media in raw form, and may still be extracted by a trained computer user.

Systems have also been proposed which perform encryption on data and application programs stored on tape and disk. These systems provide improved security over the password protection described above. As one example, a system disclosed in U.S. Pat. No. 5,325,430 to Smyth et al. (incorporated herein by reference in its entirety) includes a security module attached to a personal computer, which performs data and application program encryption. The security module communicates with a removable smart card assigned to a given user, which contains encryption keys used by the security module. Although the security provided by this system is adequate for many applications, the circuitry used to implement the system is complex, and administration of the system for producing and assigning keys and smart cards is time consuming and expensive.

Another system for encrypting files is disclosed in U.S. Pat. No. 5,235,641 to Nozawa et al., the disclosure of which is also incorporated herein by reference in its entirety. In this system, data stored to a magnetic tape is encrypted by a cryptographic adapter, which is located in the data path between a host processor and a tape drive. In this system, the host processor generates cryptographic keys, which are stored on the tape itself. This requires additional logic to encrypt the keys as well as the data, and consequently, this system requires relatively complex circuitry, and leaves the key potentially recoverable from the tape itself if the key encryption scheme is broken.

Thus, existing encryption systems for personal and portable computers have serious drawbacks, and have not been widely implemented. In particular, a system which is useful for an individual personal computer user has not been heretofore provided. Such a system should provide data security with flexibility and without expensive administration or implementation.

SUMMARY OF THE INVENTION

In a first aspect of the present disclosure, a data security apparatus for use with a digital data storage apparatus is disclosed. In one embodiment, the data security apparatus includes: a first apparatus configured to receive digital data from a host processor, where the first apparatus is configured to encrypt the digital data with an encryption key, the first apparatus further configured to forward the digital data to the digital data storage apparatus in an encrypted form; a boot mechanism configured to verify a user; and after the user is successfully verified, cause the encryption key to be generated.

In one variant, the verification of the user is based at least on a received user input; the received user input includes a password; and the encryption key is based at least in part on the password.

In another variant, the boot mechanism is configured to automatically execute on a power event or a reset event.

In a second aspect of the present disclosure, a data security apparatus for use with a digital data storage apparatus is disclosed. In one embodiment, the data security apparatus includes: a boot mechanism configured to verify a user; and after the user is successfully verified, cause the encryption key to be generated; and a second apparatus configured to retrieve digital data from the digital data storage apparatus, wherein the second apparatus is further configured to decrypt the digital data with a decryption key that is different than the encryption key.

In one variant, the boot mechanism is configured to automatically execute on a power event or a reset event.

In another variant, the verification of the user is based at least on a received user input.

In yet another variant, the received user input comprises a user-specific input, a code, or a password.

In yet another variant, the encryption key is based at least in part on the password.

In a third aspect of the present disclosure, a method for securely encrypting a digital data storage apparatus is disclosed. In one embodiment, the method includes: verifying a user; and when the user is successfully verified, determining at least one cryptographic key; receiving digital data; encrypting the digital data with the at least one cryptographic key;

and storing the encrypted digital data to a digital data storage apparatus; and otherwise denying access to at least a portion of the digital data storage apparatus.

In one variant, the at least one cryptographic key includes an encryption key and a decryption key, and the encryption key and decryption key are different from one another.

In another variant, the verification of the user is based on a user input.

In yet another variant, the received user input comprises a user-specific password or code.

In yet another variant, the at least one cryptographic key is used for encryption and decryption, and is determined based at least in part on a hardware specific code, or the at least one cryptographic key is stored in a key register.

In a fourth aspect of the disclosure, a data security apparatus is disclosed. In one embodiment, the data security apparatus includes a first apparatus configured to receive digital data from a host processor, where the first apparatus is further configured to encrypt the digital data with one or more cryptographic keys, and to forward the digital data to a digital data storage apparatus in an encrypted fowl; and a boot mechanism that is configured to verify the host processor based on a hardware identifier. When the host processor is successfully verified, access to the digital data storage apparatus is enabled. The one or more cryptographic keys are based at least on the hardware identifier.

In one variant, the hardware identifier is uniquely associated with the host processor.

In another variant, the first apparatus is configured to encrypt only a portion of the digital data.

In yet another variant, the boot mechanism is further configured to execute before the access to the digital data storage apparatus is enabled.

In yet another variant, the boot mechanism is additionally configured to derive the one or more cryptographic keys.

DETAILED DESCRIPTION OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

Figure 1:
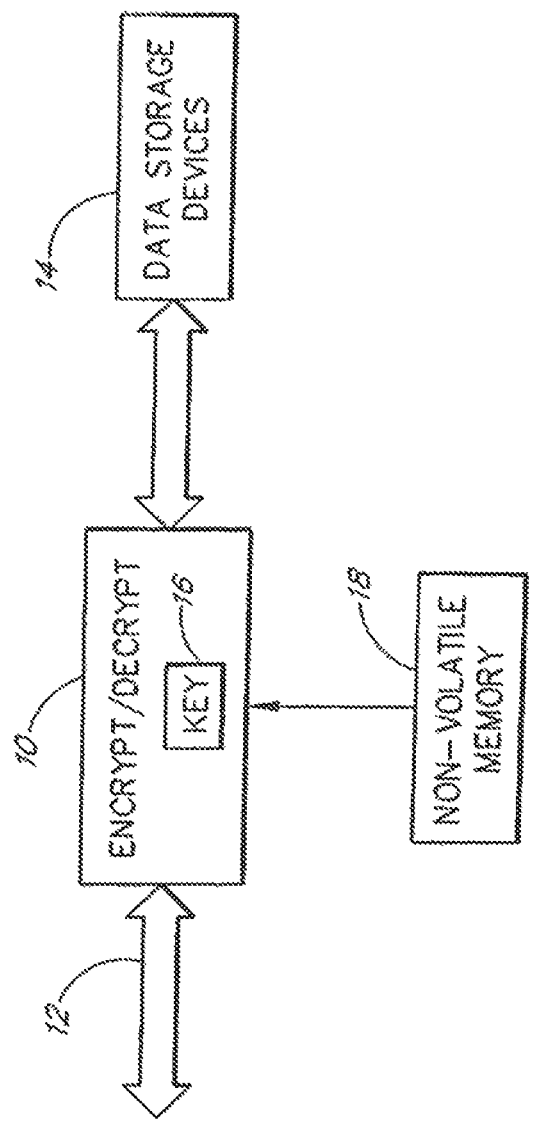
FIG. 1 is a block diagram of a data storage system incorporating an embodiment of the invention.

Referring now to FIG. 1, a data storage system is illustrated which incorporates aspects of the invention. The system includes encryption/decryption logic 10 that is connected to receive digital data from a data bus 12. The encryption/decryption logic 10 is configured to forward data received from the data bus 12 to data storage devices 14 in an encrypted form. The data or information transferred between the data bus 12 and the data storage devices may comprise application programs themselves, data used by application programs, or any other information that the host computing system stores to the data storage devices 14 of the system. As will be further explained below with reference to FIGS. 2 and 3, the encryption/decryption logic may in some embodiments be configurable to perform the encryption and decryption on a selectable subset of the data storage devices if desired by a user of the system.

The algorithm used to perform the encryption may comprise any known encryption algorithm, and many different alternatives will be well known to those of skill in the art. In many applications, the encryption and decryption process will be defined in part by a key 16, which is utilized by the encryption/decryption logic 10 to perform the data manipulation, which results in data encryption and decryption. In some systems, the same key is used for both the encryption and decryption processes, but in others, the key 16 may comprise a pair of keys, wherein one is used for encryption, and the other for decryption. Given the variety of encryption and decryption schemes which have been and are currently being developed, the use of the word "key" is intended to encompass any piece of information, data, parameter, definition, configuration of logic circuitry, or other entity or circuit arrangement which serves at least in part to configure the encryption/decryption logic, or to otherwise in any way partly or wholly define the data encryption process which is performed by the encryption/decryption logic 10.

Also provided in the system of FIG. 1 is a non-volatile memory location 18. As is well known in the art, a non-volatile memory has the property that the data or information stored in it remains when the host system is powered down. Non-volatile memory may comprise battery backed up RAM, EPROM, EEPROM, or ROM memory circuitry, for example. In the application of FIG. 1, this memory location 18 may advantageously store an identification code. The stored identification code may be used to derive, at least in part, the key 16, which is used in the encryption process. This derivation may involve simply making the key the identification code itself, or may alternatively involve a logical or mathematical manipulation or transformation of the identification code to produce the key. In some embodiments, as will be further explained below, the key 16 may be derived in part from the identification code stored in the non-volatile memory and in part from a password or other piece of information entered by a user of the computing system.

The system of FIG. 1 includes many advantages over prior art data encryption schemes and is especially applicable to individual personal computer and laptop computer users. In some embodiments, the circuitry of FIG. 1 may be incorporated into, for example, a laptop computer that is sold to an individual for household and/or business use. In most of these situations, the purchased computer will not be a member of a group of computers, which is controlled or overseen by a system administrator that will create and assign encryption keys, smart cards, etc. Rather, the laptop will be simply used as is, for both personal and business use by a user who is generally unfamiliar with data security techniques or procedures.

In these embodiments, the identification code may comprise a multi-bit data word, which is associated with the individual laptop being used. When stored in a non-erasable memory element such as ROM or EPROM, the identification code may be substantially permanently associated with the individual laptop being used. It will be appreciated that data security in these environments is enhanced if different laptops do not typically share a common identification code. When this is true, the key 16 derived from the identification code will be different in different laptops produced by the laptop manufacturer. It will therefore also be appreciated that the data stored on the data storage devices 14 will be encrypted differently by different laptops. Thus, a removable media such as a floppy disk, tape, or writeable CD will not be useable on any computer except the one that originally stored the data. Thus, a level of security is provided for removable media, which may be lost, mislaid, or stolen.

It will also be appreciated that this level of security is provided without any intervention by the user or a system administrator. Key generation and data encryption is automatic and transparent. In addition, this data security scheme is easily implemented in the large scale production of laptops and other personal computers. Machine specific data encryption may be provided with the simple provision of non-volatile storage of information, which defines the data encryption process performed. This information may advantageously be substantially uniquely associated with the host computing logic or host computer. This may be ensured by using some form of sequential numbering scheme for the identification code, or alternatively a random or pseudo-random numbering scheme with a low probability of producing two identical identification codes for different laptops. However, it may be noted that it is not necessary to absolutely guarantee that each laptop have a uniquely defined encryption process. The desirable feature is that there be a relatively low probability that lost or stolen media will be readable in some other laptop or personal computer available to someone who has found or has stolen the media elements. Therefore, duplicate identification codes and keys defining identical encryption processes may be provided within a given set of computers while still maintaining a useful level of security. Thus, the association between identification codes and their respective host computers need only be substantially unique such that a reasonable level of security is created.

Figure 2:
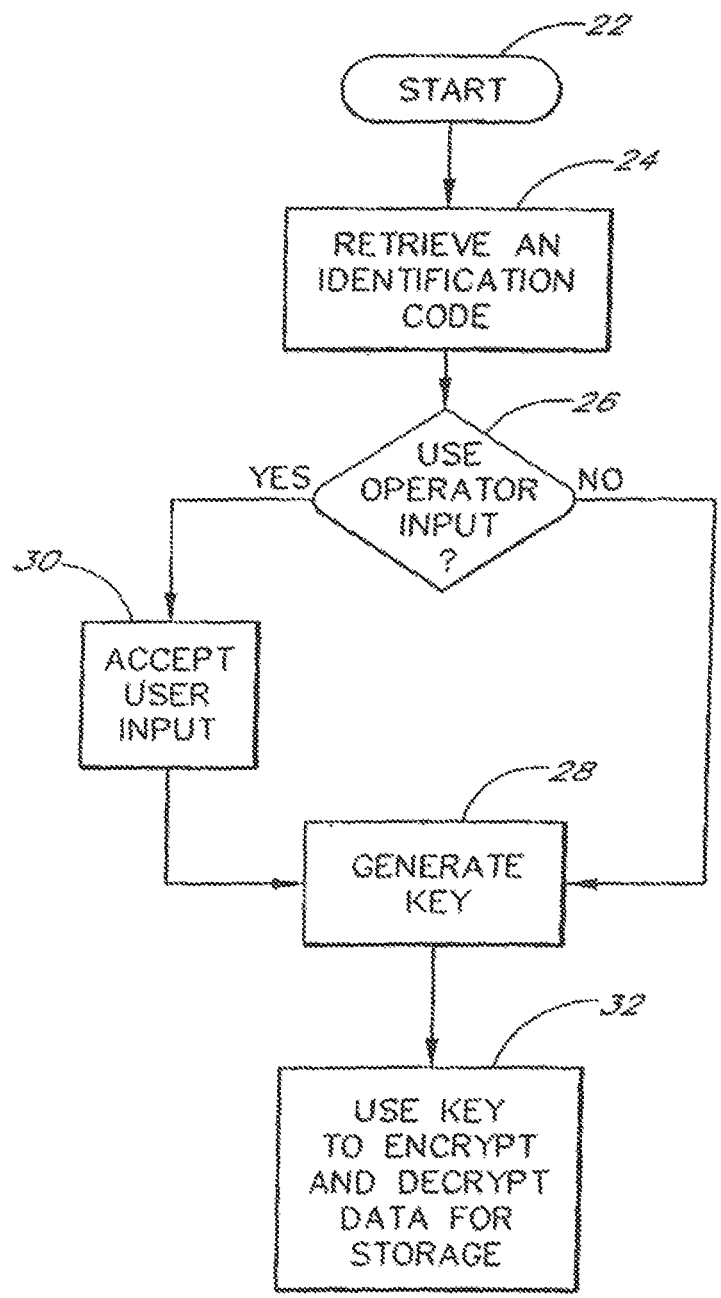
FIG. 2 is a flow chart illustrating acts performed during key generation in an embodiment of the invention.

FIG. 2 illustrates a method of key generation and data encryption according to one embodiment of the invention. It will be appreciated that the method shown in FIG. 2 may, in one embodiment, be implemented on hardware illustrated in FIG. 1.

The method begins at a start state 22, and moves from there to step 24, where an identification code is retrieved. The identification code may be stored in a non-volatile memory, and may in addition be substantially uniquely associated with specific host computer hardware.

The system then moves to decision state 26, where it is decided whether or not some user input should be utilized in the process of encryption key generation. If not, the method moves directly to step 28, where an encryption key is generated using the identification code retrieved at step 24. If user input is to be used in key generation, the method moves from step 26 to step 30, where the user input is accepted by the system. The user input may, for example, comprise an alphanumeric code, which is typed into the computer keyboard by the user in response to a system prompt. Following this, the method moves to step 28, where the key is generated using both the identification code and the user input. The user input from step 30 may be an alphanumeric sequence, which is converted to a multi-bit word (for example, to ASCII code). This word may be combined with the identification code in many ways, including concatenation as one simple example, or other more complicated logical or mathematical manipulations may be used.

Following key generation at step 28, the key is used to encrypt and decrypt data that is stored to and retrieved from a data storage device at step 32. In the personal computer or laptop computer context, the series of steps leading to and including key generation may be performed during the boot operation prior to any accesses to encrypted data storage devices. In these embodiments, all data, programs, etc. stored on the data storage devices are encrypted with the same key, a key that may require some user input to generate as described above. The computer may be either factory configured or user configured to require or not require user input for key generation.

The addition of user input to key generation provides an enhancement to data security beyond that provided when only the identification code is used to derive an encryption key. This is because if the entire computer is lost or stolen, when the computer is turned on only the computer owner will know what code or password to input in order to generate the proper key at step 28 of FIG. 2. Thus, access to encrypted programs and data is effectively prevented even with the original computer the hands of an unauthorized user.

Figure 3:
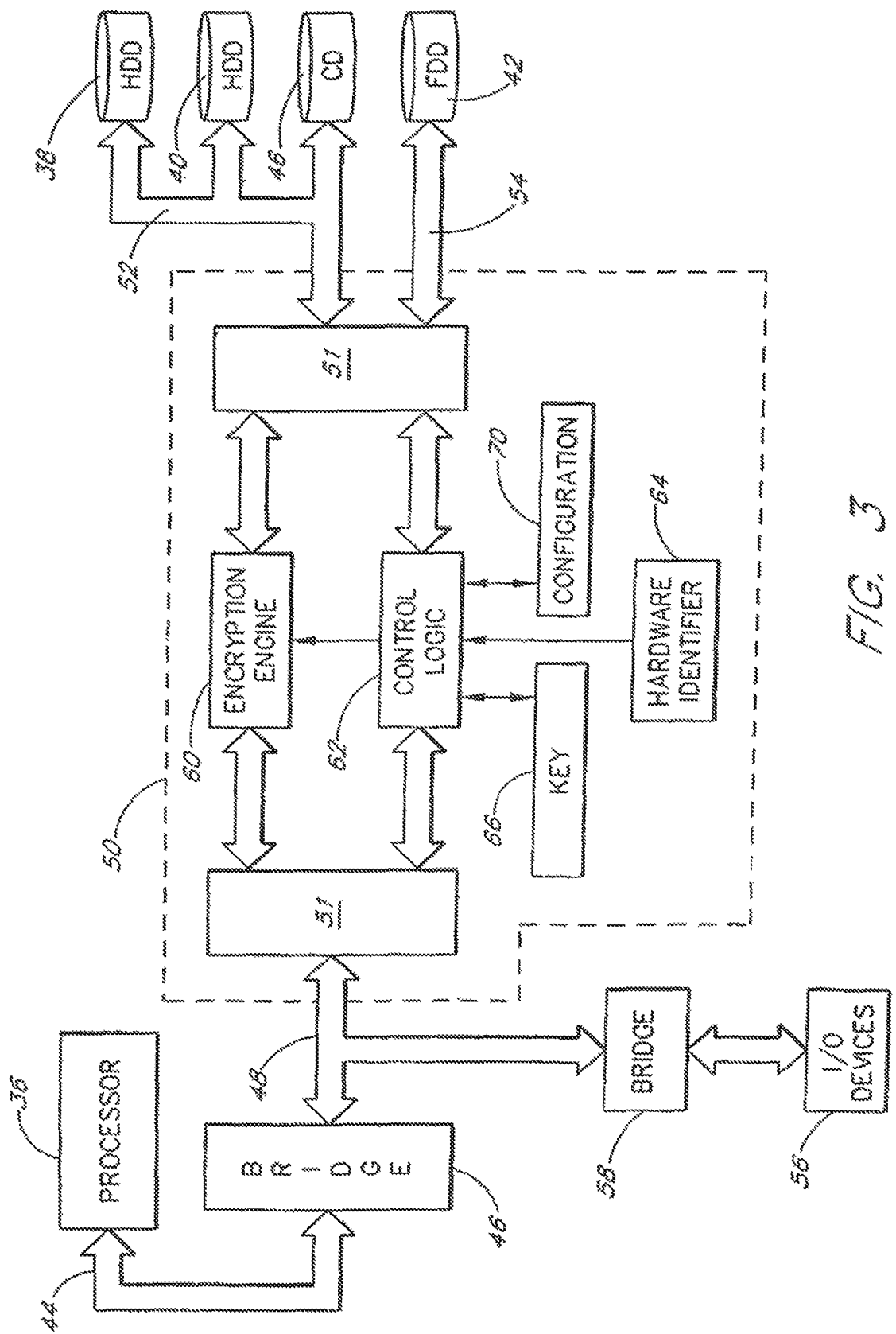
FIG. 3 is a block diagram illustrating an encrypting data path passing from a host processor to data storage devices, in accordance with one embodiment of the invention.

An embodiment of the invention is also illustrated in FIG. 3 which may be used to implement the process described above with reference to FIG. 2. In this Figure, a computer system is shown having a host processor 36, which may, for example, comprise a member of the Pentium® family of processors such as the Pentium, Pentium Pro, or Pentium II. Although industry standard PC architecture is used as an illustrative example in this. Figure, it will be appreciated that many computer designs may be implemented using the principles illustrated herein. Also provided as part of the computer system of FIG. 3 are a plurality of data storage devices, including hard disk drives 38, 40, a floppy disk drive 42 and a CD drive 46, which may be of a writeable type.

The processor 36 interfaces with a host bus 44, which also interfaces with a bridge, circuit 46. The bridge circuit 46 routes data from the host bus 44 to a PCI bus 48. The PCI bus 48 provides a data source to a logic circuit 50 which is provided in the data path between the PCI bus 48 and an IDE bus 52 and floppy drive control bus 54 which interface directly with the respective data storage devices 38, 40, 42, 44, and 46. The PCI bus 48 may also receive data from I/O devices 56 via a PCI to ISA bridge circuit 58.

The logic circuit 50 advantageously includes an encryption engine 60 which operates to encrypt data routed to one or more of the data storage devices 38, 40, 42, 46 and to decrypt data routed from one or more of the data storage devices 38, 40, 42, 46. The logic circuit 50 will also generally include input and output bridge circuitry 51 to buffer data and convert the data transfer protocol from the PCI format bus 48 to the busses 52, 54, which interface directly with the data storage devices 38, 40, 42, 46.

The encryption engine operates under the control of control logic 62. The control logic, in turn, receives information for controlling the encryption engine from three sources. The first is a memory location, which stores a hardware identifier 64. As described above, this hardware identifier 64 may be substantially uniquely associated with the computer hardware. The memory may comprise a non-volatile writeable or read only memory to help ensure essentially permanent storage of the hardware identifier 64. As is also described above, the hardware identifier 64 stored in the memory may be used by the control logic 62 (or alternatively the processor 36) to at least in part derive a key for encryption and decryption of data to and from the data storage devices 38, 40, 42, 46. The control logic may also accept user input as described above to be used as additional information for key derivation.

This generated key may be stored in a key register 66, which also is coupled to the control logic 62. Prior to data being stored or retrieved from the data storage devices 38, 40, 42, 46, the key may be retrieved from the key register 66 for use by the encryption engine 60 during the encryption and decryption processes.

A configuration register 70 may also be coupled to the control logic 62. The content of the configuration register 70 may advantageously be user defined, and may include bits that determine which of the data storage devices 38, 40, 42, 46 have data encrypted before storage to the media, and which have data decrypted when data is retrieved from the media. This feature provides significant flexibility to the user. A user may, for example, want to encrypt some, but not all, data stored onto a floppy disk with the floppy drive 42. It may also be advantageous to have at least one hard drive 38 or 40, which contains DOS, Windows™, Unix™, or other operating system software, to remain unencrypted.

The configuration register may also contain bits which determine whether or not user input should be incorporated into the key being used to perform the encryption and decryption. In some embodiments, a different key may be stored for different drives. In this case, some of the keys may be generated with user input, and some without.

One advantageous aspect of the encryption system described herein is that it may be created with relatively minor modifications to currently existing integrated circuits. PCI to ISA and PCI to IDE bridges are well known and understood, and are commercially available from, for example, Intel Corporation. In one embodiment, therefore, an encryption, engine, control logic, a key register, and a configuration register may be incorporated into an existing bridge integrated circuit design to produce a portion of the logic circuit 50. Furthermore, individual EPROM, EEPROM, and ROM memories which include pre-programmed identification codes are available commercially from Dallas Semiconductor of Dallas Tex. as part numbers 052401 and 052430 for example. These devices include a unique 48 bit serial number in a ROM storage location which may be utilized as the memory location which stores the hardware identifier 64. These memory chips are available with a serial I/O interface for reading the identification code and any other stored data. In this embodiment, therefore, a bridge integrated circuit which includes the encryption logic may interface over a serial bus to a separate memory integrated circuit which stores the hardware identifier.

Figure 4:
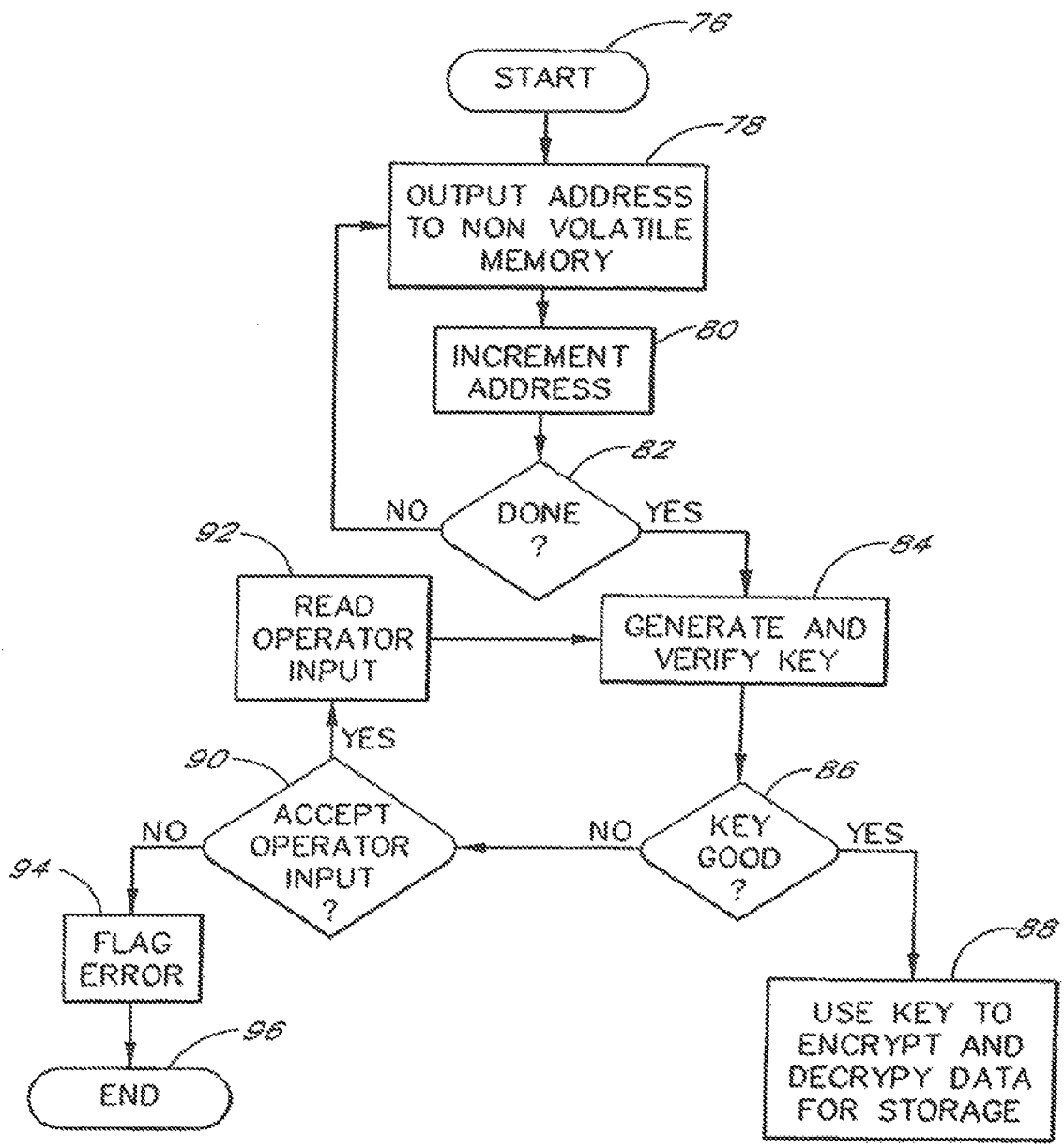
FIG. 4 is a flow chart illustrating acts performed during key generation in another embodiment of the invention.

FIG. 4 illustrates a method of key generation and verification which may be implemented with the system illustrated in FIG. 3. In the method of FIG. 4, the control logic 62 (FIG. 3) may be utilized to perform key generation and verification without intervention by the processor 36 (FIG. 3). The method begins at a start state 76. Following this start block 76, the system retrieves the hardware identifier 64 (FIG. 3) from the nonvolatile memory location where it is stored. This retrieval process may involve the sequential retrieval of a set of data words from the memory as illustrated by the loop defined by blocks 78, 80, and 82. Thus, at block 78, the control logic 62 may output an initial address to the nonvolatile memory to retrieve a first data word comprising a portion of the hardware identifier code 64. The address may then be incremented at block 80. If, at decision block 82, it is determined that the entire code has not yet been retrieved, the system loops back to block 78 and outputs the incremented address to the non-volatile memory to retrieve another segment of the code.

Once the entire code has been retrieved, at block 84 the control logic 62 may then generate and verify the key. As mentioned above, the process of key generation may involve merely storing a concatenation of the data words retrieved at steps 78-82 in the key register 66. This could occur during the retrieval process, or afterwards. Alternatively, mathematical or logical manipulations may be performed on the retrieved data words prior to their storage into the key register. Key verification may also be performed in a number of ways known to those of skill in the art. For example, a checksum or CRC field may be provided in the configuration register 70 or control logic 62. If no user input is utilized in key generation, this field may be generated during an initialization sequence performed during the manufacture of either the logic circuit 50 or a computer system that the logic circuit 50 is incorporated into. If user input is utilized in key generation, this CRC or checksum field may be generated during a password initialization routine when the password to be utilized in key generation is initially entered by the user.

Following key generation and verification, the system moves to a decision state 86, where the result of the key verification of block 84 is checked. If the key is verified as good, the system moves to block 88, and the key is used to encrypt and decrypt data during data storage and retrieval operations. There are several reasons why key verification might fail. An error in reading the hardware identifier may cause faulty key generation. Tampering with the logic circuit 50 may also result in incorrect key generation. Additionally, key verification may fail because required operator input to be used in key generation has not yet been entered by a user. Thus, a failure of key verification may force user input. This is illustrated in FIG. 4 by the fact that if at decision state 86, the key has not been verified as good, the system moves to a another decision state 90. At decision state 90, the system determines whether or not user input should be accepted and used in the key generation process. If the system deter mines that operator input should be accepted, the system moves to block 92, where the input is read. The system then loops back to block 84, where the key is generated using both the operator input and the retrieved identification code, and is again verified against the stored CRC or checksum field. If the operator input was the correct password, the key will be verified as good at the next iteration of decision block 86, and at block 88, the key will be used to encrypt and decrypt data as described above.

If, however, the operator input was incorrect, the key verification process will fail, and the system will again move to decision state 90, where the system again determines whether or not user input should be accepted. It will be appreciated that the user may be given two or more attempts to successfully input the proper password. Thus, the system may loop back to blocks 92 and 84 a plurality of times, anyone of which may result in correct password entry and normal data encryption and decryption at block 88.

After a selected number of iterations of incorrect password entry, the system may decide at state 90 to refuse to accept further operator input for key generation. In this event, the system moves to block 94 where the key error is flagged by the system. System response to the error flag may vary widely. The system may indicate to the user that the password entries are incorrect. The system may even be programmed to destroy the content of encrypted drives in the event the key verification process fails, or fails for a selected number of consecutive verification attempts.

The encryption system described thus provides data security to personal and laptop computer users in a transparent manner without requiring time consuming and expensive system administration or complex and expensive hardware. The system is especially adapted to individual users, and the high volume production of computers for these users.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A data security apparatus for use with a digital data storage apparatus, comprising:
    a first apparatus configured to receive digital data from a host processor, where the first apparatus is configured to encrypt the digital data with an encryption key, the first apparatus further configured to forward the digital data to the digital data storage apparatus in an encrypted form; and
    a boot mechanism configured to:
        verify a user; and
        after the user is successfully verified, cause the encryption key to be generated;
    wherein the verification of the user is based at least on a received user input;
    wherein the received user input comprises a password; and
    wherein the encryption key is based at least in part on the password.

2. The data security apparatus of claim 1, wherein the boot mechanism is configured to automatically execute on a power event.

3. The data security apparatus of claim 1, wherein the boot mechanism is configured to automatically execute on a reset event.

4. A data security apparatus for use with a digital data storage apparatus, comprising:
    a first apparatus configured to receive digital data from a host processor, where the first apparatus is configured to encrypt the digital data with an encryption key, the first apparatus further configured to forward the digital data to the digital data storage apparatus in an encrypted form;
    a boot mechanism configured to:
        verify a user; and
        after the user is successfully verified, cause the encryption key to be generated;
    and
    a second apparatus configured to retrieve the digital data from the digital data storage apparatus, wherein the second apparatus is further configured to decrypt the digital data with a decryption key that is different than the encryption key.

5. The data security apparatus of claim 4, wherein the boot mechanism is configured to automatically execute on a power event.

6. The data security apparatus of claim 4, wherein the boot mechanism is configured to automatically execute on a reset event.

7. The data security apparatus of claim 4, wherein the verification of the user is based at least on a received user input.

8. The data security apparatus of claim 7, wherein the received user input comprises a user-specific input.

9. The data security apparatus of claim 7, wherein the received user input comprises a code.

10. The data security apparatus of claim 7, wherein the received user input comprises a password.

11. The data security apparatus of claim 10, wherein the encryption key is based at least in part on the password.

12. A method for securely encrypting a digital data storage apparatus, comprising:
    verifying a user;
    when the user is successfully verified:
        determining at least one cryptographic key;
        receiving digital data;
        encrypting the digital data with the at least one cryptographic key; and
        storing the encrypted digital data to a digital data storage apparatus; and
    otherwise denying access to at least a portion of the digital data storage apparatus;
    wherein the at least one cryptographic key comprises an encryption key and a decryption key, and the encryption key and decryption key are different from one another.

13. The method of claim 12, where the verification of the user is based on a user input.

14. The method of claim 13, where the user input comprises a user-specific password or code.

15. The method of claim 12, where the at least one cryptographic key is used for encryption and decryption.

16. The method of claim 12, where the at least one cryptographic key is determined based at least in part on a hardware specific code.

17. The method of claim 12, where the at least one cryptographic key is stored in a key register.

18. The method of claim 12, wherein the encryption key and/or the decryption key is determined based at least in part on a hardware specific code.

19. The method of claim 12, wherein the encryption key and/or the decryption key is stored in a key register.

20. A data security apparatus, comprising:
    a first apparatus configured to receive digital data from a host processor, where the first apparatus is further configured to encrypt the digital data with one or more cryptographic keys, and to forward the digital data to a digital data storage apparatus in an encrypted form; and
    a boot mechanism that is configured to verify the host processor based on a hardware identifier; and
    when the host processor is successfully verified, enable access to the digital data storage apparatus;
    wherein the one or more cryptographic keys are based at least on the hardware identifier.

21. The data security apparatus of claim 20, wherein the hardware identifier is uniquely associated with the host processor.

22. The data security apparatus of claim 21, wherein the first apparatus is configured to encrypt only a portion of the digital data.

23. The data security apparatus of claim 20, wherein the boot mechanism is further configured to execute before the access to the digital data storage apparatus is enabled.

24. The data security apparatus of claim 20, wherein the boot mechanism is additionally configured to derive the one or more cryptographic keys.

* * * * *